Figure 1:
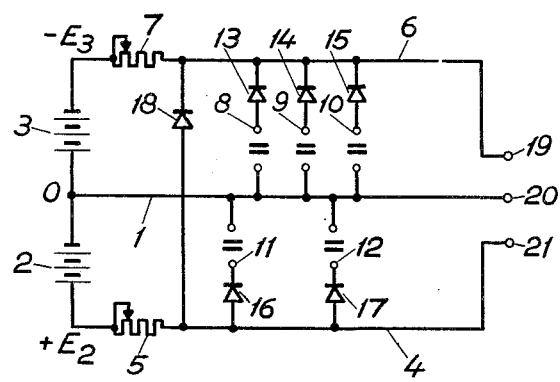

Nov. 12, 1957  A. GARDE ET AL  2,813,262
ELECTRIC SELECTOR DEVICE
Filed Dec. 1, 1953

INVENTORS.
Aage Garde and
Eric Persson
BY
— Attorney.

United States Patent Office 2,813,262
Patented Nov. 12, 1957

2,813,262

ELECTRIC SELECTOR DEVICE

Aage Garde and Erik Persson, Vasteras, Sweden, assignors to Allmanna Svenska Elektriska Aktiebolaget, Vasteras, Sweden, a Swedish corporation Application December 1, 1953, Serial No. 395,563

Claims priority, application Sweden December 12, 1952

1 Claim. (Cl. 340—176)

The present invention relates to an electric selector device for quantities able to be represented as D. C. voltages and which operates with purely static members. At some types of regulation it is necessary to pay regard to a large number of quantities, some of which are only allowed to reach certain limit values, e. g. maximum or minimum values. For this purpose the device ought to be furnished with some sort of limiting members. It may also be desirable that some of the control quantities predominate over other quantities, and for this purpose some kind of selector arrangement is necessary. The present invention relates to a device paying regard to said requirements, which can be used in all cases where the control quantities can be represented as D. C. voltages. According to the invention, no movable members are used in the selector device involving that it will be practically free from maintenance. The control quantities, furthermore, can be combined in a very large number of ways, and only simple measures are to be taken to utilise the device for paying regard to an increased number of quantities.

The outstanding feature of the present invention is that said D. C. voltages, each one in series with a unidirectional electric device, preferably a dry-plate rectifier, in the following called a current valve, are connected in parallel some between a neutral conductor and a conductor connected to plus voltage via a resistor (plus conductor), and the remainder between said neutral conductor and a conductor connected to minus voltage via a resistor (minus-conductor). Those D. C. voltages, the largest of which is to be selected, are connected in one group between the neutral conductor and the minus-conductor, the associated current valves having their forward direction from the neutral conductor to the minus-conductor, and the D. C. voltages, the smallest of which is to be selected, are connected in another group between the plus-conductor and the neutral conductor, the associated current valves having their forward direction from the plus-conductor to the neutral conductor. Furthermore, a current valve is connected with its forward direction from the plus-conductor to the minus-conductor. The purpose of this arrangement is to let the larger of said selected D. C. voltages of the two groups appear between the minus-conductor and the neutral conductor, and to let the smaller of the two selected voltages appear between the neutral conductor and the plus-conductor.

One form of the invention is shown in Figure 1 on the accompanying drawing. The preferred form is intended for selection between five quantities, where the largest of three quantities in one group shall be selected, which in its turn shall be compared with the two other quantities in another group in which the smaller of these two quantities is selected. In Figure 1, 1 designates a neutral conductor connected to a D. C. source. The quantities which are to be compared shall be represented as D. C. voltages, which is almost always possible. These D. C. voltages are connected between the neutral conductor 1 and the input terminals 8—12, the terminals 8—10 being connected to the anodes of current valves 13—15, respectively, the cathodes of said current valves being connected to the minus-conductor 6. In a corresponding way the terminals 11 and 12 are connected to the cathodes of current valves 16 and 17 respectively, the anodes of said last mentioned current valves being connected to the plus-conductor 4. The plus-conductor is furthermore connected to the minus-conductor via a current valve 18, with its forward direction being from plus-conductor to minus-conductor, the output terminals 19, 20 and 21 connected to the conductors 6, 1 and 4, respectively, voltages can be derived.

Figure 2:
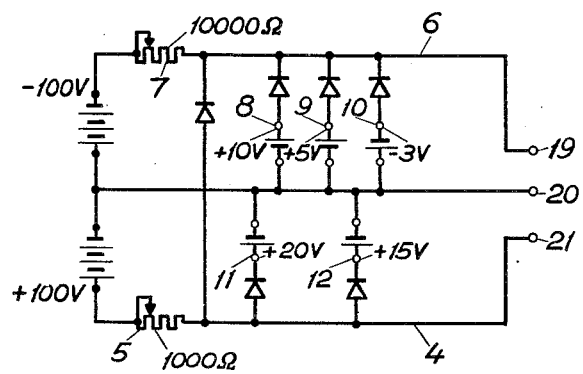

In Figure 2 a case is indicated in which the voltage $E_2$ is equal to $E_3$, equal to 100 v.; the resistance of resistor 5 is equal to 1,000 ohms and the resistance of resistor 7 is equal to 10,000 ohms; the voltages to be compared are $E_8 = 10$ volts
$E_9 = 5$ volts
$E_{10} = -3$ volts
$E_{11} = 20$ volts
$E_{12} = 15$ volts Then the output voltage will be $E_{19} = E_{21} = 15$ volts (with respect to terminal 20). To explain this result, let us for a moment disconnect valve 18, so that the two halves of the selector device work separately. Then a current $I_7$ flows from battery 3 and voltage $E_8$ through valve 13 and resistor 7. The magnitude of this current is $$I_7 = \frac{100 + 10}{10000} = 11 \text{ ma.}$$

The valves 14 and 15 are blocked by voltages $E_{14} = 5$ volts and $E_{15} = 13$ volts, rsepectively, because the potential of the minus-conductor 6 equals the potential of terminal 8 when valve 13 conducts.

In the other half of the device a current $$I_5 = \frac{100 - 15}{1000} = 85 \text{ ma.}$$

flows from battery 2 and the source of voltage $E_{12}$ through valve 17 and resistor 5. The valve 16 is blocked by 5 volts, being the difference in potential between terminal 11 and the plus-conductor 4 when valve 17 conducts. When valve 18 is disconnected, terminals 19 and 21 thus attain potentials which correspond, respectively, to the largest voltage in the group of voltages connected to the minus-conductor (which is 10 volts) and the smallest voltage in the group connected to the plus-conductor (which is 15 volts). The first part of the above-mentioned selection is thus fulfilled.

If valve 18 is now connected in, as shown in the drawing, it short-circuits the difference in voltage between terminals 21 and 19, as this voltage-difference is applied in the forward direction of the valve. As the valve 18 short-circuits a voltage (=5 volts) some current has to increase, and the only current which is free to do so is the smaller of the currents $I_5$ and $I_7$. The reason for this is that the current $I_5$ is so large that only a part of it is needed to provide the smaller current through valve 18 and resistor 7. Thus a part of the current $I_5$ continues to flow through valve 17, thus keeping this valve open (conducting). Consequently the potential at conductor 4 remains at 15 volts. Since, therefore, the drop in potential across the resistor 5 remains constant after insertion of valve 18, the current $I_5$ must remain constant, and the short-circuiting of the said voltage difference of 5 volts can be compensated only by an increase of $I_7$ to a new value $$I_7{}^1 \text{ equal to } \frac{100 + 15}{10000} = 11.5 \text{ ma.}$$

When the valve 18 is connected in, therefore, the minus-conductor 6 assumes the same potential as the plus-conductor 4 with the result that the valves 13, 14 and 15 are blocked by 5 volts, 10 volts and 18 volts respectively.

If the above reasoning is applied for difference values of $E_{11}$ and $E_{12}$, it is found that valve 18 will conduct when the smaller of $E_{11}$ and $E_{12}$ is larger than $E_8$ (which is the largest voltage in the upper group), but will be blocked when it is smaller. When valve 18 is blocked, terminals 19 and 21 may have different potentials, and it will be found that the voltage between terminals 19 and 20 will always equal the larger of the two selected voltages in the two groups. The second part of the above-mentioned selection is thus fulfilled.

Under the conditions specified above (i. e. $I_5 > I_7$), the voltage between terminals 20 and 21 always equals the smallest voltage in the group connected to the plus-conductor 4, irrespective of the voltages connected to the minus-conductor 6.

In a simple way it is possible to increase as well the number of quantities to be compared as the selection possibilities between the groups containing the D. C. voltages representing such quantities. It is thus possible to connect an arbitrary number of current circuits in parallel between the neutral conductor and the minus-conductor or between the plus-conductor and the neutral conductor. The shown selector device can also be combined with other similar selector devices and the voltages derived from the corresponding output terminals 19—21 of the other selector devices can be connected in series with current valves in further selector devices, so that still more complicated selection problems can be solved by dividing the problem into a number of successive selection operations.

We claim as our invention:

An electric device for selecting quantities represented as direct current voltages, comprising a neutral conductor, a plus conductor connected to plus voltage through a resistor, a minus conductor connected to minus voltage through a resistor, means connecting in parallel between the said neutral and minus conductors a group of the said quantity representing voltages the largest of which is to be selected, means connecting in parallel between the said neutral and plus conductors a group of the quantity representing voltages the smallest of which is to be selected, a current valve connected in series with each of said quantity representing voltages and said valves having their forward directions from the neutral to the minus conductor in the first-mentioned group and from the plus to the neutral conductor in the second group, and a current valve connected between the plus and minus conductors and having its forward direction towards the minus conductor so that the largest of the quantity representing voltages can be derived between the minus and neutral conductors and the smallest of such voltages can be derived between the neutral and plus conductors.

References Cited in the file of this patent

UNITED STATES PATENTS

| | | |
|---|---|---|
| 2,456,499 | Fritzinger | Dec. 14, 1948 |
| 2,566,426 | Parks | Sept. 4, 1951 |
| 2,675,538 | Malthanner | Apr. 13, 1954 |